(12) United States Patent
An et al.

(10) Patent No.: US 10,836,669 B2
(45) Date of Patent: Nov. 17, 2020

(54) MOLTEN MATERIAL STIRRING SYSTEM AND METHOD FOR STIRRING THE MATERIAL

(71) Applicant: Corning Incorporated, Corning, NY (US)

(72) Inventors: Jang-hun An, Asan-si (KR); Tae-woo Jung, Asan-si (KR); JinSoo Kim, Asan-si (KR); Hosoon Lee, Cheonan-si (KR); Tae-hyun Lee, Cheonan-si (KR); Se-Yeol Lim, Asan-si (KR)

(73) Assignee: Corning Incorporated, Corning, NY (US)

( * ) Notice: Subject to any disclaimer, the term of this patent is extended or adjusted under 35 U.S.C. 154(b) by 181 days.

(21) Appl. No.: 16/206,580

(22) Filed: Nov. 30, 2018

(65) Prior Publication Data

US 2019/0152824 A1 May 23, 2019

(30) Foreign Application Priority Data

Nov. 20, 2017 (KR) .......................... 10-2017-0155185

(51) Int. Cl.
*C03B 5/187* (2006.01)
*G05D 5/00* (2006.01)
*B01F 7/00* (2006.01)
*C03B 5/167* (2006.01)

(52) U.S. Cl.
CPC ............ *C03B 5/1875* (2013.01); *B01F 7/001* (2013.01); *B01F 7/002* (2013.01); *B01F 7/00016* (2013.01); *B01F 7/00908* (2013.01); *C03B 5/167* (2013.01); *G05D 5/00* (2013.01); *B01F 7/00141* (2013.01); *B01F 7/00291* (2013.01)

(58) Field of Classification Search
CPC ......... C03B 5/18; C03B 5/187; C03B 5/1875; B01F 7/002; B01F 7/1605; B01F 7/1695
USPC ....................................................... 65/135.3
See application file for complete search history.

(56) References Cited

U.S. PATENT DOCUMENTS

| 2,126,351 | A | * | 8/1938 | Sharp | ...................... C03B 5/187 65/325 |
|---|---|---|---|---|---|
| 7,735,340 | B2 | | 6/2010 | Burdette et al. | |
| 8,650,910 | B2 | | 2/2014 | Kim et al. | |
| 2003/0101750 | A1 | | 6/2003 | Goller et al. | |
| 2010/0080078 | A1 | * | 4/2010 | Goller | ....................... C03B 5/16 366/145 |
| 2012/0042693 | A1 | * | 2/2012 | Kim | ....................... C03B 5/435 65/29.19 |
| 2012/0047953 | A1 | | 3/2012 | Feng et al. | |

(Continued)

FOREIGN PATENT DOCUMENTS

GB          1220183 A  *  1/1971   ........... C03B 5/1875

OTHER PUBLICATIONS

International Search Report and Written Opinion PCT/IB2018/001486 dated Apr. 22, 2019, 11 Pgs.

*Primary Examiner* — Cynthia Szewczyk (57) ABSTRACT

A system and method for stirring molten material such as glass are provided. To prevent sagging of a cover of a stirring system, a portion where deformation or sagging may significantly occur is suspended by a suspension system, so that local sagging and deformation of the cover is suppressed. As a result, a crack which may occur in the cover is suppressed, and therefore, contamination of the molten material is likewise suppressed.

14 Claims, 12 Drawing Sheets

(56) References Cited

U.S. PATENT DOCUMENTS

2014/0117017 A1* 5/2014 De Angelis .......... F16J 15/104
  220/361
2015/0360990 A1 12/2015 Lentes et al.

* cited by examiner

मोलTEN MATERIAL STIRRING SYSTEM AND METHOD FOR STIRRING THE MATERIAL

BACKGROUND

This application claims the benefit of priority under 35 U.S.C. § 119 of Korean Patent Application Serial No. 10-2017-0155185 filed on Nov. 20, 2017, the content of which is relied upon and incorporated herein by reference in its entirety.

1. Field

One or more embodiments relate to a molten material stirring system and method, and more particularly, to a molten material stirring system and method for effectively suppressing deformation and damage of a cover of a stirring vessel accommodating molten material.

2. Description of the Related Art

Equipment for manufacturing flat glass using molten material, e.g., molten glass, includes a stirring system which stirs molten glass.

A stirring system includes a stirring vessel accommodating molten glass, a cover of the stirring vessel, and a stirring blade positioned inside the stirring vessel. Over time, the cover may experience deformation and damage in high temperature production environments.

SUMMARY

One or more embodiments include a molten material stirring system and method for effectively suppressing the sagging or deformation of a cover of a stirring vessel of a melting chamber.

One or more embodiments include a molten material stirring system and method for preventing particles from being generated due to friction between a cover and a rotating rod passing through the cover and preventing molten material from being contaminated by the particles by suppressing the deformation of the cover.

One or more embodiments include a molten material stirring system and method for remarkably decreasing costs incurred by replacement of a cover by suppressing the deformation of the cover.

Additional aspects will be set forth in part in the description which follows and, in part, will be apparent from the description, or may be learned by practice of the presented embodiments.

According to one or more embodiments, a molten material stirring system includes a stirring vessel configured to accommodate molten material; a stirring blade positioned inside the stirring vessel; a rotating rod to which the stirring blade is fixed; a cover disposed over the stirring vessel, the cover comprising a central hole configured to allow the rotating rod to extend therethrough; a plurality of hanging posts positioned a predetermined distance between an outer edge of the cover and the center hole; and a suspension system configured to impart a lifting force on the cover through the plurality of hanging posts.

The cover may include a first cover member and a second cover member divided by at least one border regionextending through the central hole. Each of the hanging posts may include a first post member and a second post member respectively positioned on the first cover member and the second cover member proximate the border region and configured to face each other and to be combined with or separated from each other. The suspension system may include a holder which holds the first post member and the second post member together.

The hanging posts may be symmetrically disposed with respect to the hole along the at least one border region.

A bonding preventing coating layer may be formed on a surface of each of the first and second post members. The bonding preventing coating layer may include at least one of zirconia, silica, and alumina.

Each hanging post may be positioned to be nearer to an edge of the hole than to the outer edge of the cover.

The suspension system may further include a rail-type fixed frame positioned at an upper portion of the stirring vessel, a first moving frame configured relative to the fixed frame to be movable back and forth in a first direction, a second moving frame configured to be movable back and forth a predetermined distance in a second direction different from the first direction, and a link member of which a length is adjustable and which suspends the holder from the second moving frame.

The suspension system may further include a locking device on the first moving frame to mechanically fix a position with respect to the fixed frame. In some embodiments, the suspension system may further include a locking device on the second moving frame to mechanically fix a position with respect to the first moving frame.

The locking device may be implemented as a toggle clamp including a rotating lever and a spindle driven by the rotating lever.

According to one or more embodiments, a molten material stirring method includes accommodating molten material to be stirred in a stirring vessel covered with a cover comprising a central hole; stirring the molten material in the stirring vessel using a stirring blade fixed to a rod passing through the central hole; and imparting a lifting force from a suspension system upon the cover through a plurality of hanging posts, the plurality of hanging posts positioned a predetermined distance between an outer edge of the cover and the central hole.

The hanging posts are symmetrically disposed at both sides of the central hole.

The cover may be divided into a first cover member and a second cover member by at least one border region extending through the central hole. Each of the hanging posts may be divided into a first post member and a second post member respectively positioned on the first cover member and the second cover member proximate the border region to face each other and to be combined with or separated from each other. The first post member and the second post member may be held together by a holder of the suspension system.

The molten material stirring method may further include forming a bonding preventing coating layer on each of the first and second post members.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Exemplary embodiments will now be described more fully with reference to the accompanying drawings. Whenever possible, the same reference numerals with be used throughout the drawings to refer to the same or like parts.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, numbers, steps, operations, elements, and/or components, but do not preclude the presence or addition of one or more other features, numbers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and/or the present application, and will not be interpreted in an overly formal sense unless expressly so defined herein.

When some embodiments can be implemented differently, particular process orders may be changed. For example, two sequential processes may be performed simultaneously or in a reverse order.

In the drawings, changes of shapes may be expected according to, for example, manufacturing techniques and/or tolerance. Accordingly, the embodiments should not be construed as being limited to the particular shapes in the drawings and should include the changes in the shapes occurring in, for example, manufacturing processes. As used herein, the term "and/or" includes any and all combinations of one or more of the associated listed items. Expressions such as "at least one of," when preceding a list of elements, modify the entire list of elements and do not modify the individual elements of the list. The term "substrate" may refer a substrate itself or a stack structure including a substrate and a layer or film formed on the surface of the substrate. The term "surface of a substrate" may refer to an exposed surface of the substrate itself or an outer surface of a layer or film formed on the substrate.

The embodiments described below involve glass products, and therefore, an object to be stirred is molten glass. However, other material than glass may be selected as an object to be stirred in other embodiments. Therefore, the embodiments should not be construed as being limited by particular material to be stirred.

Figure 1:
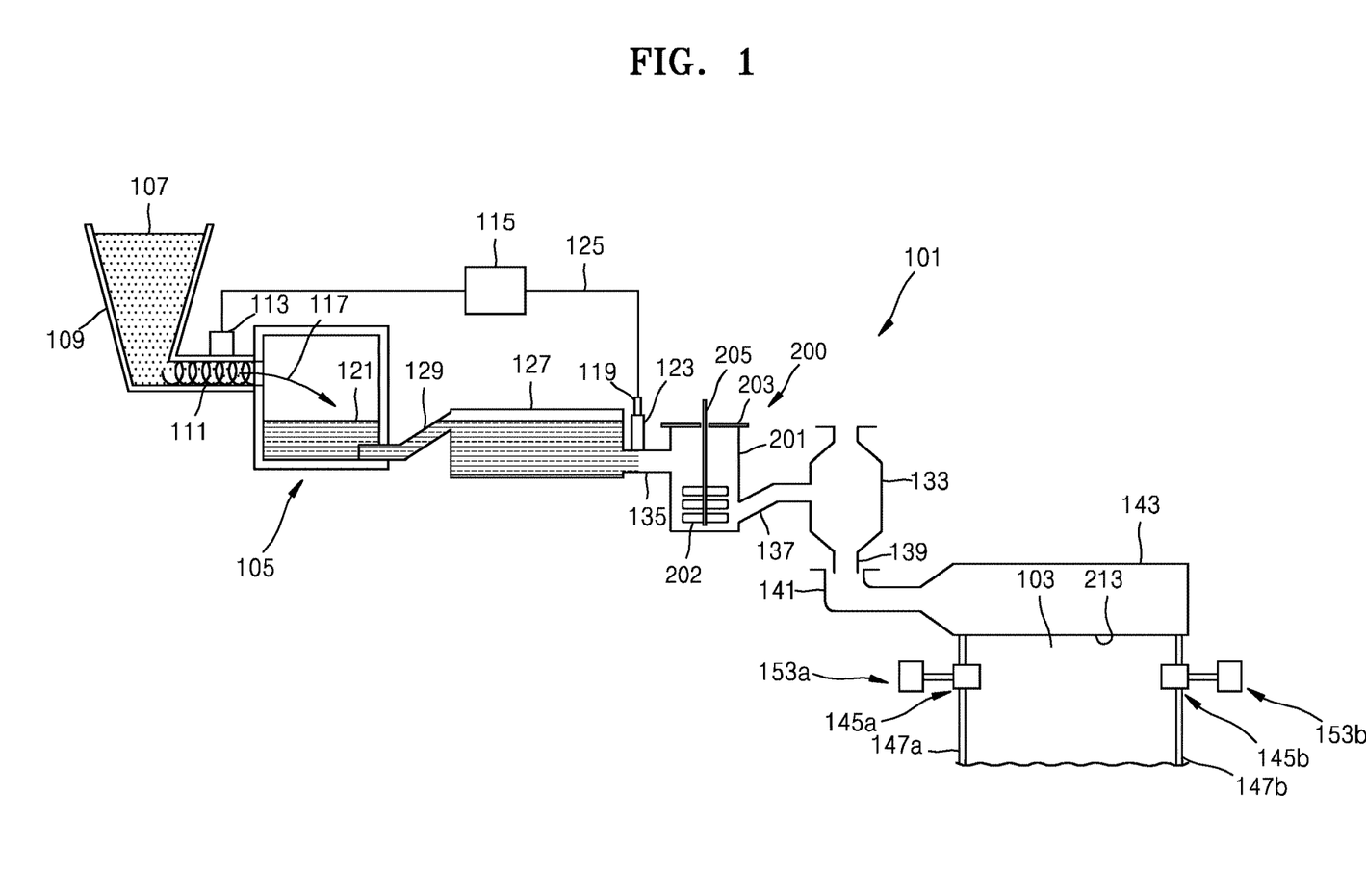
FIG. 1 shows the overall structure of a glass product manufacturing system to which a stirring system and method according to one or more embodiments are applied.

FIG. 1 is a conceptual diagram of a glass product manufacturing system 101 to which a stirring system and method according to one or more embodiments are applied.

Referring to FIG. 1, the glass product manufacturing system 101 may include a melting vessel 105 formed to accommodate a batch material 107 from a storage well 109. The batch material 107 may be injected into the melting vessel 105 by a batch conveyor 111 receiving power from a motor 113. A selective controller 115 may control the motor 113 so that a predetermined amount of the batch material 107 can be injected into the melting vessel 105, as shown by an arrow 117. A glass metal probe 119 may be used to measure a level of molten glass 121 in a standpipe 123 and transmit measurement information to the controller 115 through a communication line 125.

The glass product manufacturing system 101 may also include a refining vessel 127, e.g., a refining tube, which is positioned downstream of the melting vessel 105 and connected to the melting vessel 105 via a first connecting tube 129. A stirring vessel 201 of a stirring system 200 may be positioned downstream of the refining vessel 127. A conveyor vessel 133, e.g., a bowl, may be positioned downstream of the stirring vessel 201.

According to one or more embodiments, the stirring system 200 includes the stirring vessel 201 between the refining vessel 127 and the conveyor vessel 133, a stirring blade 202 within the stirring vessel 201, a rotating rod 205 rotating the stirring blade 202, and a cover 203 closing or covering the stirring vessel 201.

Meanwhile, a second connecting tube 135 may connect the refining vessel 127 to the stirring vessel 201 and a third connecting tube 137 may connect the stirring vessel 201 to the conveyor vessel 133. An outlet conduit 139 may be positioned to guide the molten glass 121 from the conveyor vessel 133 to an inlet 141 of a fusion drawing machine (FDM) 143. The melting vessel 105, the refining vessel 127, the stirring vessel 201, the conveyor vessel 133, and the FDM 143 are examples of molten glass stations arranged in series in the glass product manufacturing system 101.

The melting vessel 105 is usually formed of fire-resistant materials such as fire-resistant (e.g., ceramic) bricks. The glass product manufacturing system 101 may also include members formed of a platinum-containing metal, such as platinum, platinum-rhodium, platiniridium, or a combination thereof, or may include fire-resistant metals, such as molybdenum, palladium, rhenium, tantalum, titanium, tungsten, ruthenium, osmium, zirconium, and an alloy thereof, and/or zirconium dioxide. The platinum-containing members may include at least one of the first connecting tube 129, the refining vessel (e.g., a refining tube) 127, the second connecting tube 135, the standpipe 123, the stirring vessel (e.g., a stirring chamber) 201, the third connecting tube 137, the conveyor vessel (e.g., a bowl) 133, the outlet conduit 139, and the inlet 141. The FDM 143 is formed of fire-resistant material and is designed to form a glass ribbon 103.

Figure 2:
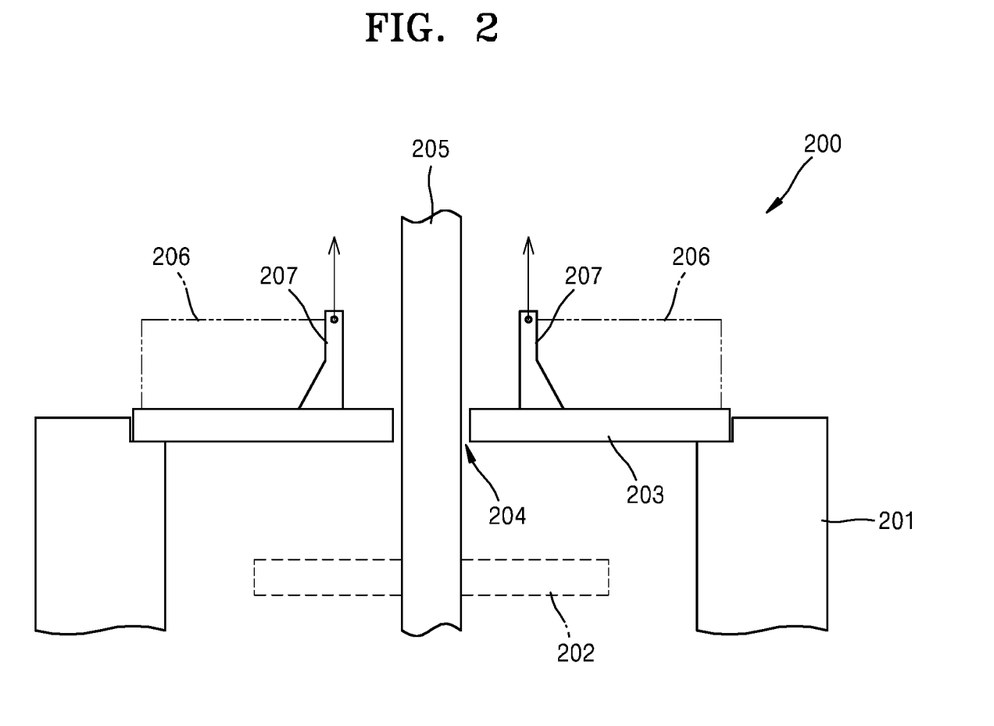
FIG. 2 is a schematic conceptual diagram of an upper portion of a stirring system according to one or more embodiments.

FIG. 2 shows the schematic structure of an upper portion of the stirring system 200 according to one or more embodiments.

Referring to FIG. 2, the cover 203 is disposed over an opening portion of the stirring vessel 201. Cover 203 includes a central hole 204 through which rotating rod 205 passes. A heat source may be embedded in the cover 203 and a thermal insulation member 206 covering the cover 203 may be provided on the cover 203. A hanging post 207 may be provided at each of both sides centering around the central hole 204 on a top surface of the cover 203. A suspension system imparts a lifting force on the cover 203 via the hanging post 207, which will be described below. Meanwhile, a bottom surface of the outer edge portion of the cover 203 remains in contact with the upper edge of the stirring vessel 201. In other words, lifting force applied to the hanging post 207 is adjusted so as to prevent local sagging of the cover 203. When the hanging post 207 is positioned nearer to the edge of the central hole 204 than to the outer edge of the cover 203, sagging is more efficiently suppressed.

Figure 3:
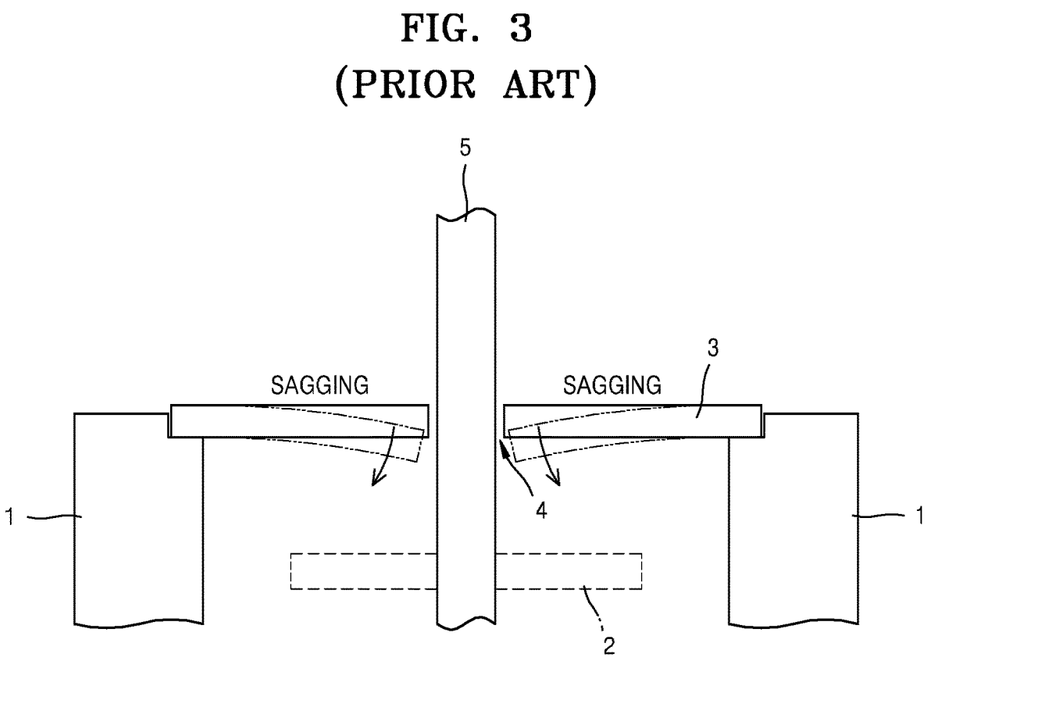
FIG. 3 shows an example of a conventional stirring system.

Meanwhile, in the structure of a cover in a conventional stirring system, a cover 3 having a hole 4 at its center is simply placed on an upper edge surface around an opening portion of a stirring vessel 1, as shown in FIG. 3. In this structure, local sagging of the cover 3 occurs noticeably around the hole 4 due to high temperature and dead load. In the mechanical structure of the cross-section of the cover 3, each cross-section has a cantilever structure in which one end is fixed and the other end forms a free end. This sagging phenomenon may result in a contact between the cover 3 and the rotating rod 5 to thereby generate particles. However, when the local hanging structure conceptually shown in FIG. 2 was used, the sagging phenomenon was remarkably suppressed, and therefore, a great improvement could be made with respect to the sagging of a cover and general problems caused by the sagging.

Figure 4:
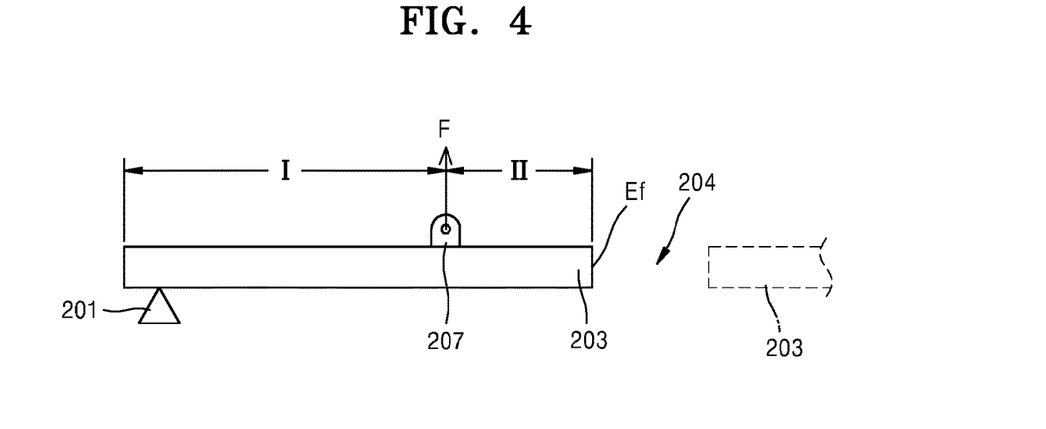
FIG. 4 shows dynamics depending on hanging of a cover in a stirring system, according to one or more embodiments.

According to one or more embodiments, the hanging structure of a cover approximately may be analyzed as a mechanical structure shown in FIG. 4, in which a simply-supported beam structure I is combined with a cantilever structure II, from the cross-sectional structure of the cover. In other words, when the cross-sectional structure of the cover 203 is differentiated and mechanically analyzed, the simply-supported beam structure I is implemented in a region between the edge of the stirring vessel 201 and the hanging post 207 and the cantilever structure II is implemented in a region between the hanging post 207 and a free end Ef facing the central hole 204.

The combination of the simply-supported beam structure I and the cantilever structure II greatly reduces the overall sagging of the cover 203. When the hanging post 207 is disposed at an appropriate position and an appropriately adjusted lifting force F is applied to the hanging post 207, the sagging of the cover 203 may be greatly decreased, and therefore, an occurrence of a crack may be substantially reduced. The lifting force F may be equivalent to a tensile force which imparts a force vector that is generally opposite to the force vector imparted by gravity.

When a cover significantly sags, as mentioned above, abrasive contact may occur between an edge of the cover around a hole and the side of a rotating rod. In this case, the side of the rotating rod may wear away, resulting in damage to the rotating rod, or particles may be generated from the rotating rod and the cover and be introduced into molten glass in a stirring vessel. These particles may be generated by the friction between the edge of the cover around the hole and the rotating rod and may also be generated from a crack caused by the sagging of the cover. In general, the stirring vessel for stirring molten glass may be mainly formed of platinum and the outer side of the cover may be mainly formed of platinum. The amount of needle platinum (Pt) was analyzed which is generally formed when platinum particles are introduced into stirred liquid glass due to the sagging of the cover and cracks and friction caused by the sagging in a conventional structure, and it was confirmed that the amount of the needle Pt was significantly reduced.

Conventionally, approaches for suppressing sagging by changing material of a cover without using the above-described hanging structure have been tried but only slightly reduce the sagging and did not solve problems fundamentally.

A cover is consumable and needs to be periodically or non-periodically replaced mainly because of disconnection of thermal wires embedded in the cover and interference between the cover and a rotating rod caused by the sagging of the cover.

Figure 5:
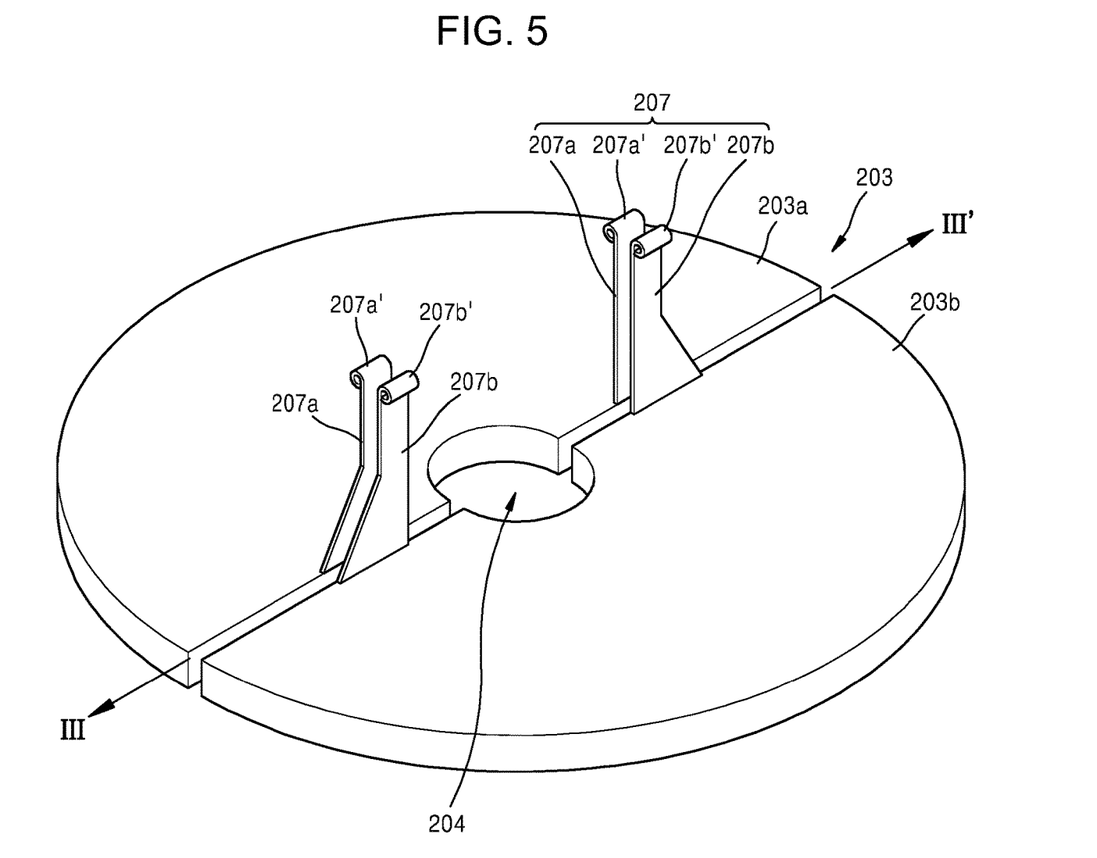
FIG. 5 is a schematic perspective view of a cover used in a stirring system, according to one or more embodiments.
Figure 6:
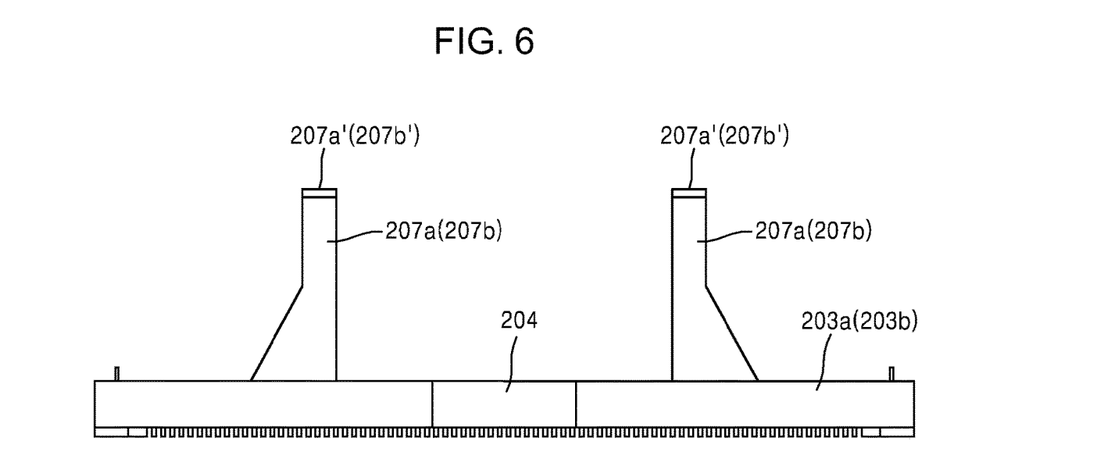
FIG. 6 is a schematic front view of a cover used in a stirring system, according to one or more embodiments.

FIG. 5 shows the cover 203 including two cover members 203a and 203b according to one or more embodiments. FIG. 6 is a front view of the cover members. Referring to FIGS. 5 and 6, the cover 203 is symmetrically divided into two cover members, i.e., a first cover member 203a and a second cover member 203b, by a border region (traversed by arrow III-III') that extends through center hole 204. Hanging posts 207 are symmetrically provided at both sides of the hole 204 proximate border region. Each of the hanging posts 207 includes a first post member 207a at the first cover member 203a and a second post member 207b at the second cover member 203b. The first and second post members 207a and 207b are combined into one hanging post 207. Rim-shape protrusions 207a' and 207b' rolling in cylindrical shape in opposite directions are respectively formed at the top ends of the respective first and second post members 207a and 207b.

Figure 7A:
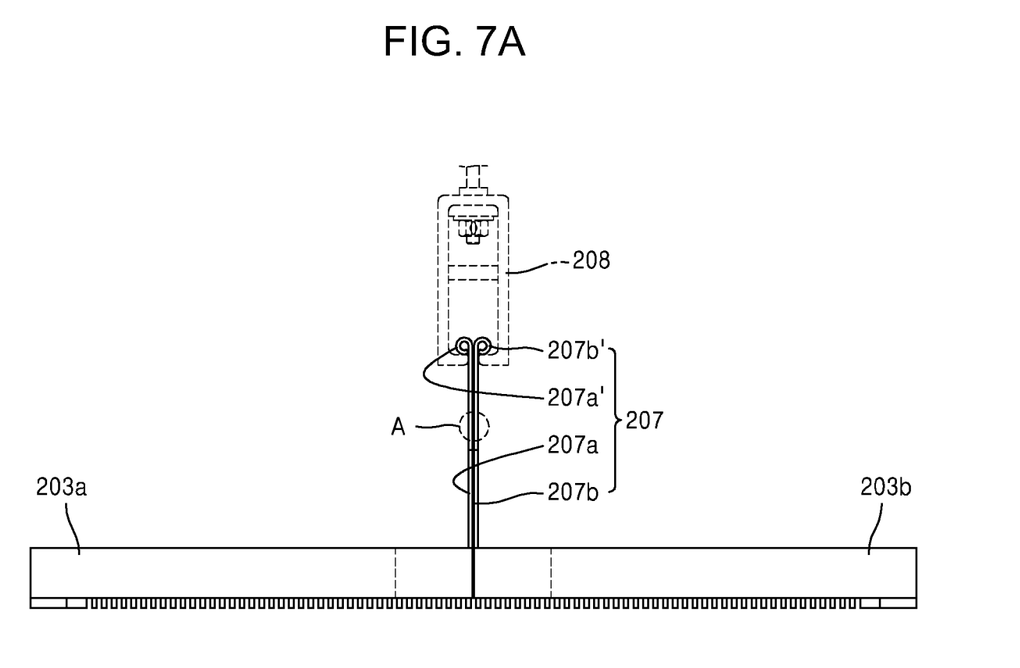
FIG. 7A shows a state where two cover members of a cover used in a stirring system are combined and a hanging post is held by a holder, according to one or more embodiments.
Figure 7B:
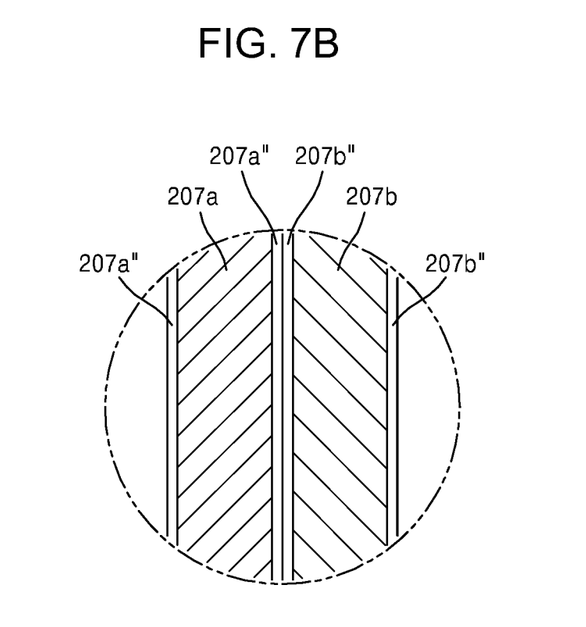
FIG. 7B illustrates a cross-sectional view of a portion "A" indicated in FIG. 7A.
Figure 8A:
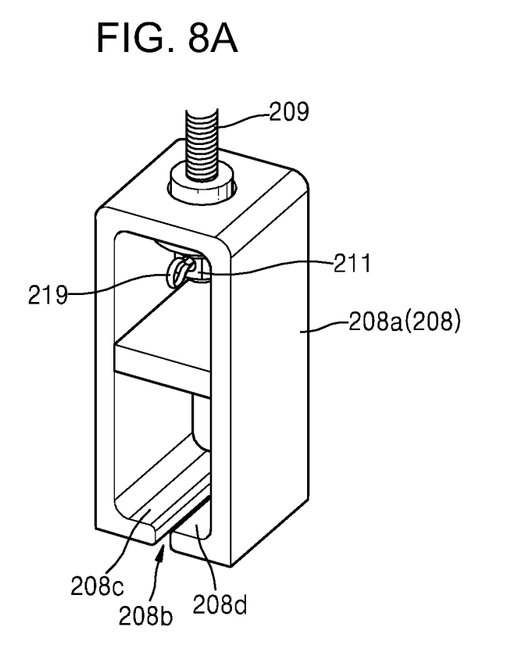
FIGS. 8A and 8B are a perspective view and a front view of a holder used in a stirring system, according to one or more embodiments.
Figure 8B:
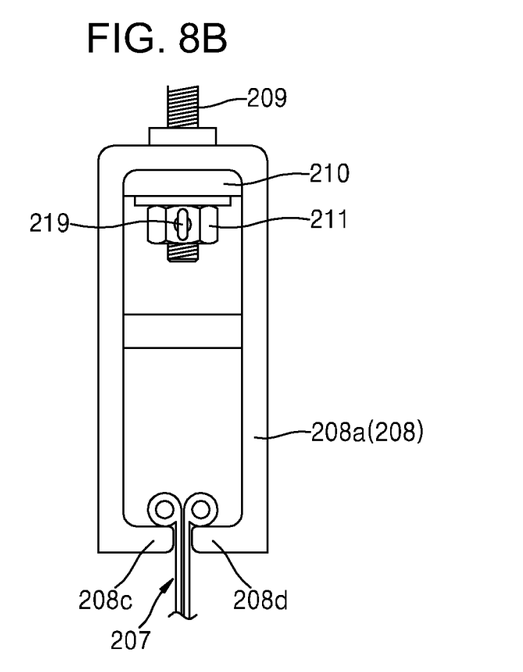

FIG. 7A shows a condition where the hanging post 207 is held by a holder 208 when the first and second cover members 203a and 203b are combined. FIG. 7B illustrates a cross-sectional view of a portion "A" indicated in FIG. 7A. FIGS. 8A and 8B are selected views of the holder 208.

Referring to FIGS. 7A and 7B, the protrusions 207a' and 207b' of the hanging post 207 are tightly in contact with each other and inserted in a slit 208b between stoppers 208c and 208d at both sides of the holder 208. The width of the slit 208b is adjusted to just allow the first and second post members 207a and 207b to pass through, so that the protrusions 207a' and 207b' are surely caught by the stoppers 208c and 208d.

In some embodiments, a bonding preventing layer may be formed on surfaces of the first and second post members 207a and 207b to, for example, prevent thermal diffusion bonding therebetween. As illustrated in FIG. 7B, the bonding preventing layer 207a" and 207b" may be provided on surfaces of the first and second post members 207a and 207b to, for example, prevent thermal diffusion bonding therebetween.

The bonding preventing layer 207a" and 207b" may be formed on the entire surfaces of the first and second post members 207a and 207b. Alternatively, the bonding preventing layer 207a" and 207b" may be formed on a part of the surfaces of the first and second post members 207a and 207b, for example, on inner surfaces of the first and second post members 207a and 207b.

The bonding preventing layer 207a" and 207b" may be formed of a ceramic material such as zirconia ($ZrO_2$), alumina ($Al_2O_3$), or silica ($SiO_2$), but is not limited thereto. In some embodiments, the bonding preventing layer 207a" and 207b" may be formed by spraying a slurry in which a powder of the ceramic material is dispersed on surfaces of the first and second post members 207a and 207b and heat-treating the slurry.

Referring to FIGS. 8A and 8B, the L-shape stopper 208c and the mirrored L-shape stopper 208d are respectively formed at the bottom of both sides of the holder 208 and the slit 208b into which the hanging post 207 is inserted is formed between the stoppers 208c and 208d.

A link member 209 connected to an upper structure of the suspension system is provided at the top of the holder 208. The link member 209 has a screw portion at the lower part thereof and is thus coupled with the holder 208 by a fastening component such as a nut 211. A structure for coupling the link member 209 with the holder 208 may include a bushing-type electrical insulating component 210 having a spacer function preventing a potential electrical conduction from the holder 208 to the link member 209. A safety pin 219 may be installed at the nut 211 to prevent the loosing of the nut 211. The safety pin 219 pierces through the nut 211 and the link member 209 engaged with the nut 211.

Hereinafter, an application of a cover suspended by the above-described hanging structure will be described in detail.

Figure 9:
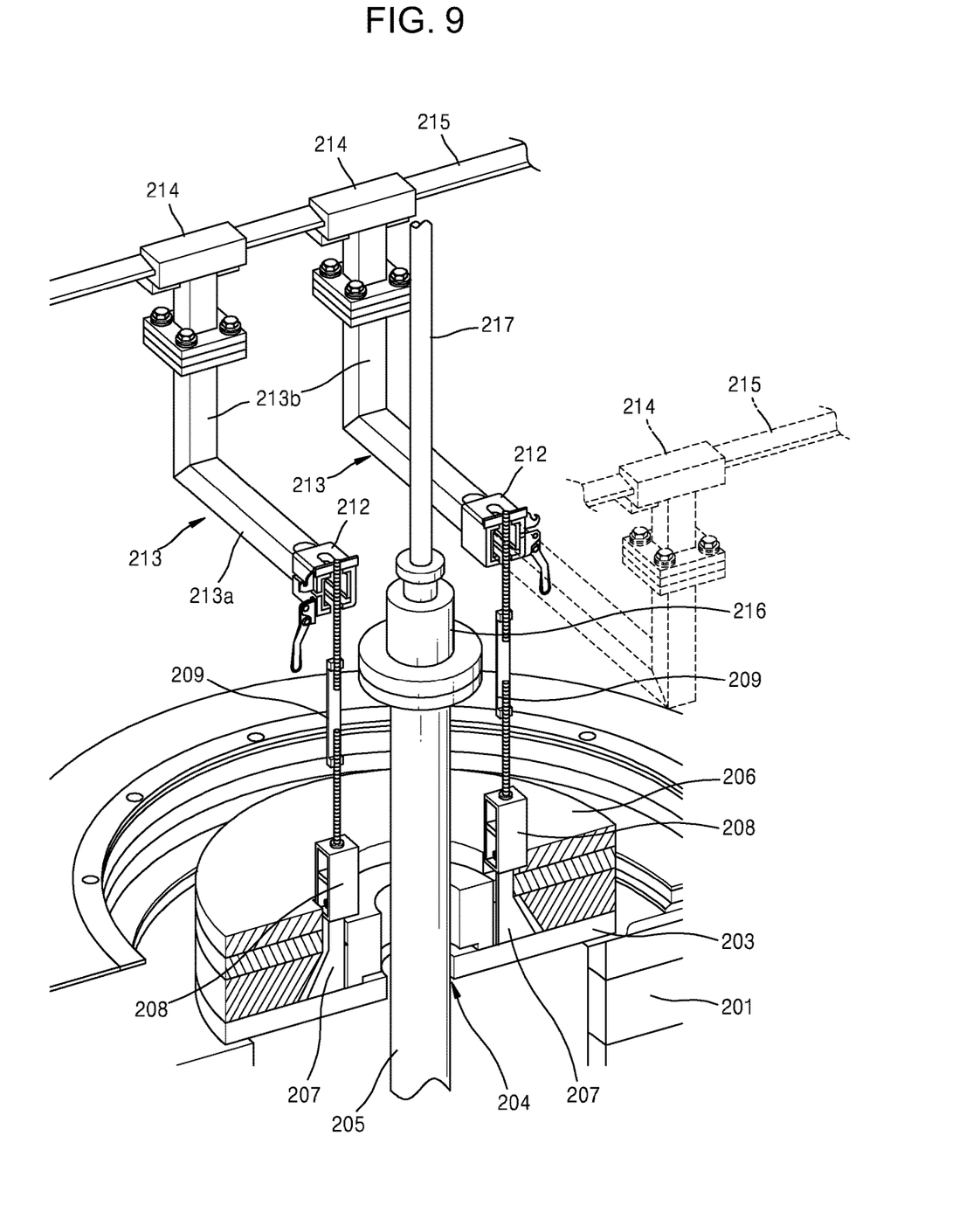
FIG. 9 is a selected perspective view showing schematically the overall structure of a stirring system according to one or more embodiments.

FIG. 9 selectively shows a stirring system using the above-described hanging structure of a cover according to one or more embodiments.

In the lower part of the stirring system shown in FIG. 9, the rotating rod 205 is inside the stirring vessel 201 and the cover 203 is positioned over the stirring vessel 201. The outer edge of the cover 203 is placed on an upper edge surface of the stirring vessel 201. Each of the two hanging posts 207 positioned on the cover 203 are inserted into and held by the holder 208 coupled with the lower part of the link member 209. The thermal insulation member 206 is installed on the cover 203 in multiple layers to prevent heat loss.

A turnbuckle structure may be applied to the link member 209 coupled with the holder 208 at the bottom. Meanwhile, the holder 208 may be connected through the link member 209 to a position controller capable of adjusting a position on an X-Y plane.

The position controller includes two rail-type fixed frames 215 installed at an upper or ceiling platform, at which an existing rotating rod driving system is installed, to extend in a first direction in parallel; two first moving frames 213 installed in parallel at the rail-type fixed frames 215 to be movable in the first direction; and second moving frames 212 respectively installed at the first moving frames 213 to be movable back and forth in a second direction different from the first direction. The position of each second moving frame 212 in the first direction is determined depending on the position of a corresponding first moving frame 213 with respect to the fixed frames 215 and the position of the second moving frame 212 in the second direction is determined depending on the position of the second moving frame 212 with respect to the first moving frame 213. Accordingly, the position of the holder 208 hanging from the second moving frame 212 may be adjusted in both first and second directions.

Figure 10:
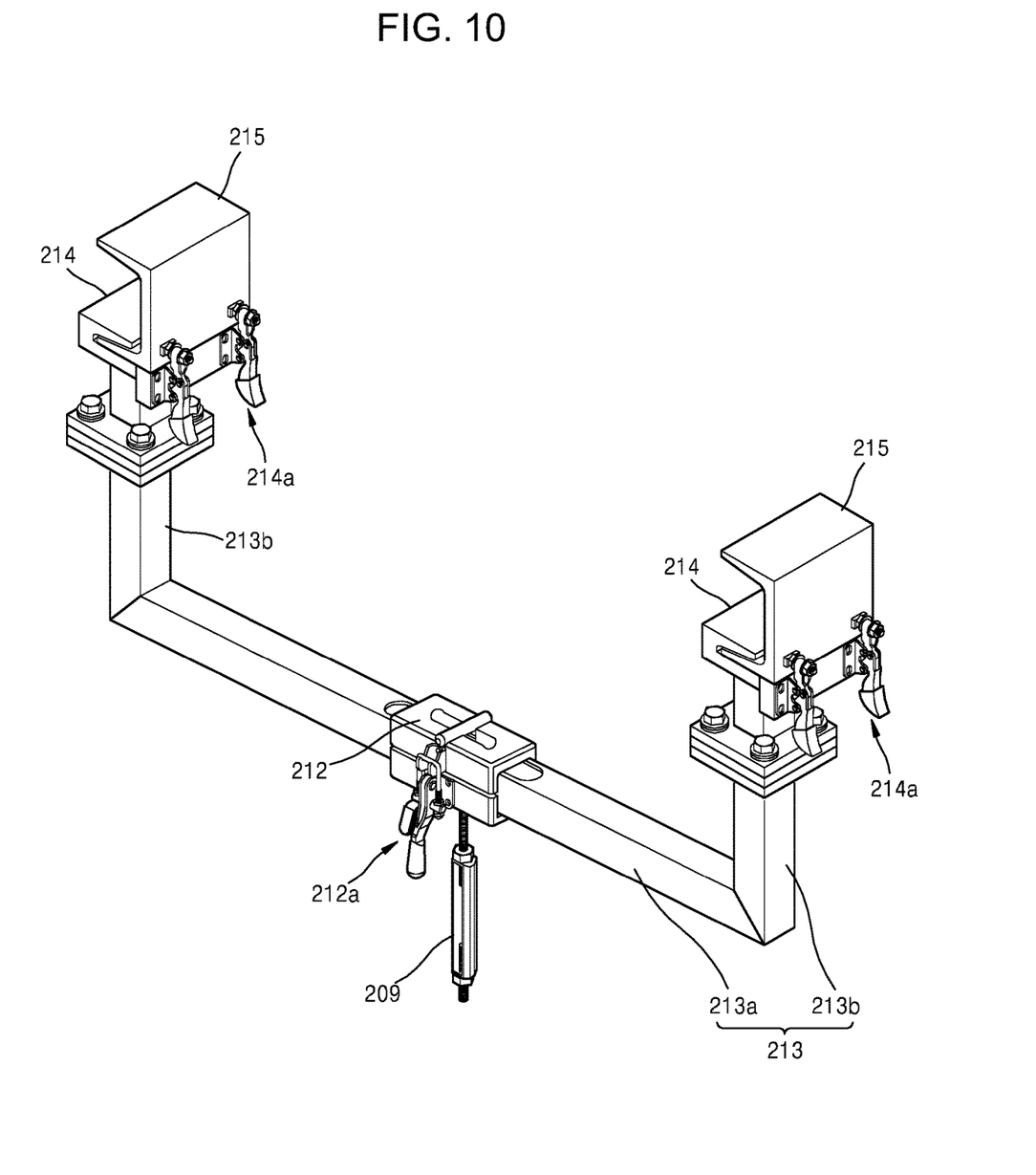
FIG. 10 is a selected perspective view of a first moving frame in a stirring system, according to one or more embodiments.
Figure 11:
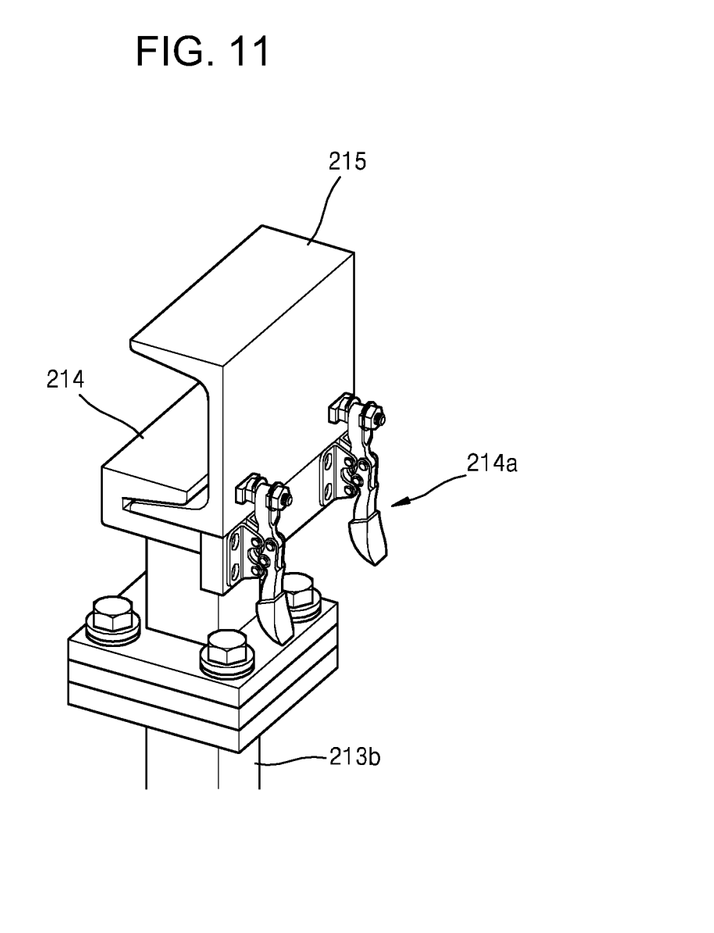
FIG. 11 shows a joint relationship between a slider installed at a first moving frame and the first moving frame with which the slider is combined in a stirring system, according to one or more embodiments.

Referring to FIGS. 10 and 11, the first moving frame 213 includes a horizontal rail 213a and vertical supports 213b at both sides of the horizontal rail 213a. Sliders 214 are respectively provided at the tops of the vertical supports 213b to slide along the fixed frames 215 installed in parallel. A pair of the first moving frames 213 are provided to respectively correspond to two hanging posts 207 provided at the cover 203.

Figure 12:
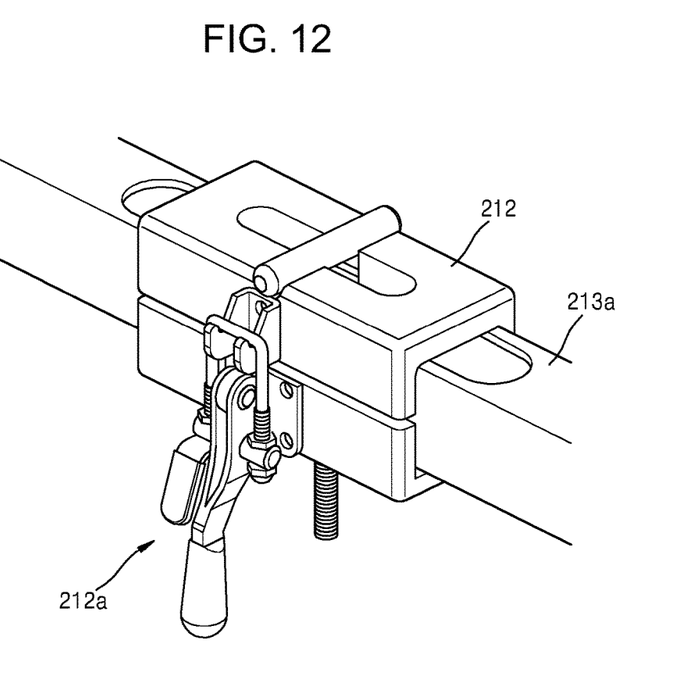
FIG. 12 is a selected diagram of a second moving frame installed at a first moving frame in a stirring system, according to one or more embodiments.

The second moving frame 212 moving in the horizontal rail 213a of the first moving frame 213 has a box-shape structure surrounding the horizontal rail 213a. A locking device 214a is provided at the first moving frame 213 to fix the position of the first moving frame 213 with respect to the fixed frame 215. A usual one-touch locking device which holds two things together using the action of a lever may be used as the locking device 214a. Similar locking device may also be provided at the second moving frame 212. Referring to FIG. 12, a toggle clamp 212a may be used to fix the position of the second moving frame 212 with respect to the horizontal rail 213a.

Referring back to FIG. 9, the rotating rod 205 can be connected through a coupler 216 to a driving shaft 217 connected to a stirrer motor provided at the ceiling platform. The coupler 216 should have heat insulating properties.

Figure 13:
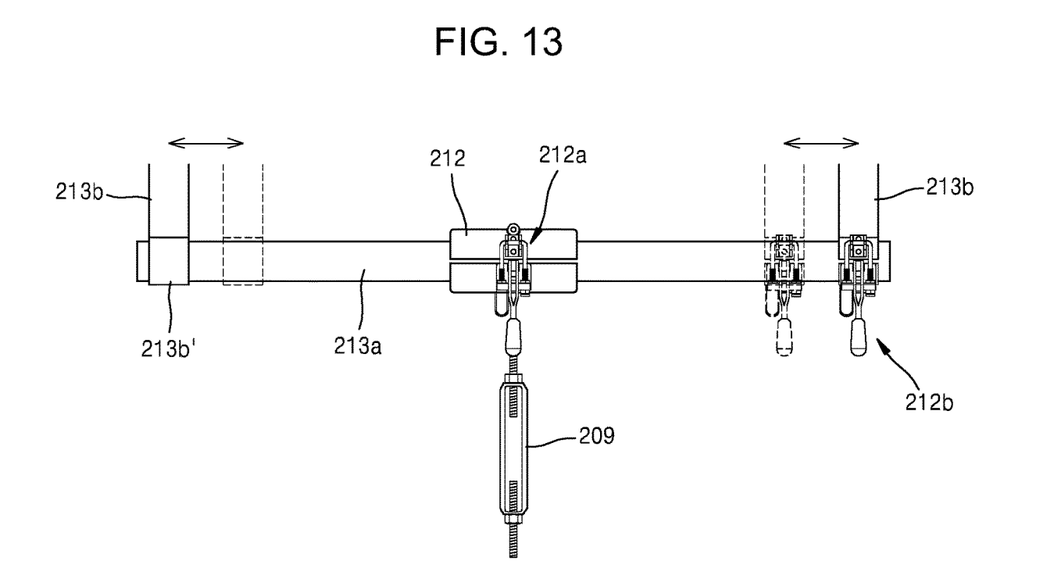
FIG. 13 shows the improved structure of a first moving structure as a stirring system according to one or more embodiments.

Referring to FIG. 13, the horizontal rail 213a combined with the second moving frame 212 may be formed to be movable from the vertical supports 213b of the first moving frame 213 by way of a slide. In other words, a tube-type coupler 213b' through which the horizontal rail 213a slides is provided at the bottom of each of the vertical supports 213b and a locking device 212b is provided at the tube-type coupler 213b' to fix the horizontal rail 213a. This structure facilitates position adjustment, removal and installation of the horizontal rail 213a during the maintenance.

Figure 14:
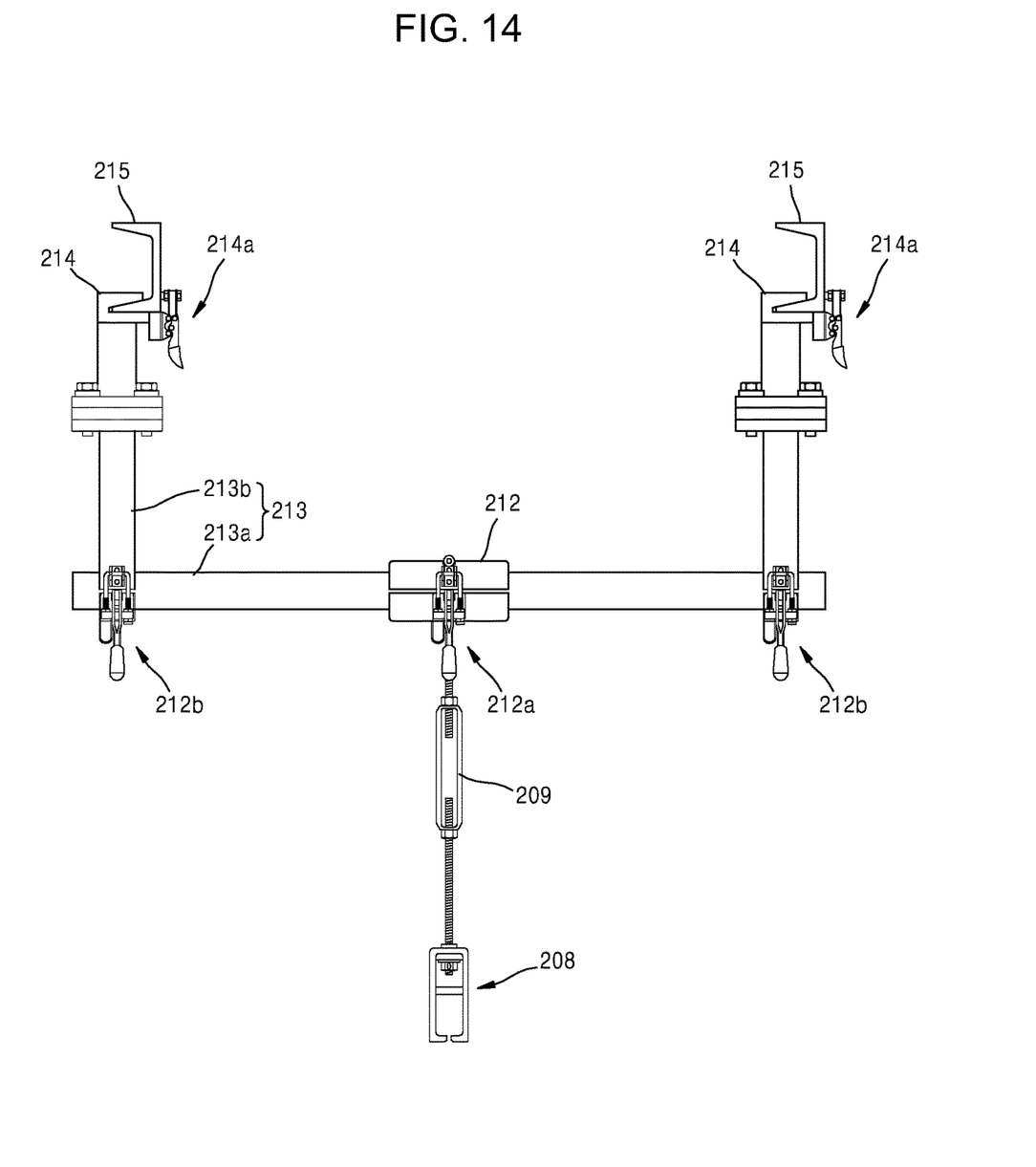
FIG. 14 shows a construct for moving a position of a holder in a stirring system, according to one or more embodiments.

FIG. 14 is a front view of the entire suspension structure which supports the hanging post 207 so that the position of the holder 208 can be moved and adjusted.

Referring to FIG. 14, the two fixed frames 215 are disposed at the top of the entire suspension structure in parallel to be separated by a predetermined distance. The sliders 214 at both sides of the first moving frame 213 are respectively combined with the fixed frames 215 to be movable. The locking device 214a is installed at each of the sliders 214 to fix the slider 214 to a corresponding fixed frame 215.

The horizontal rail 213a is movably coupled with the bottoms of the vertical supports 213b of the first moving frame 213. The locking device 212b is provided at the bottom of each vertical support 213b to fix the horizontal rail 213a to the bottom of the vertical support 213b.

Meanwhile, the second moving frame 212 is installed at the horizontal rail 213a to be movable back and forth a predetermined distance along the horizontal rail 213a. The locking device 212a, i.e., the toggle clamp, is provided at the second moving frame 212 to fix the second moving frame 212 to the horizontal rail 213a.

The top of the link member 209, such as a turnbuckle, is connected to the second moving frame 212. The holder 208 holding the hanging post 207 at the cover 203 is provided at the bottom of the link member 209.

When the above-described cover suspension structure is used in a glass stirring system, significant improvements were made.

Figure 15:
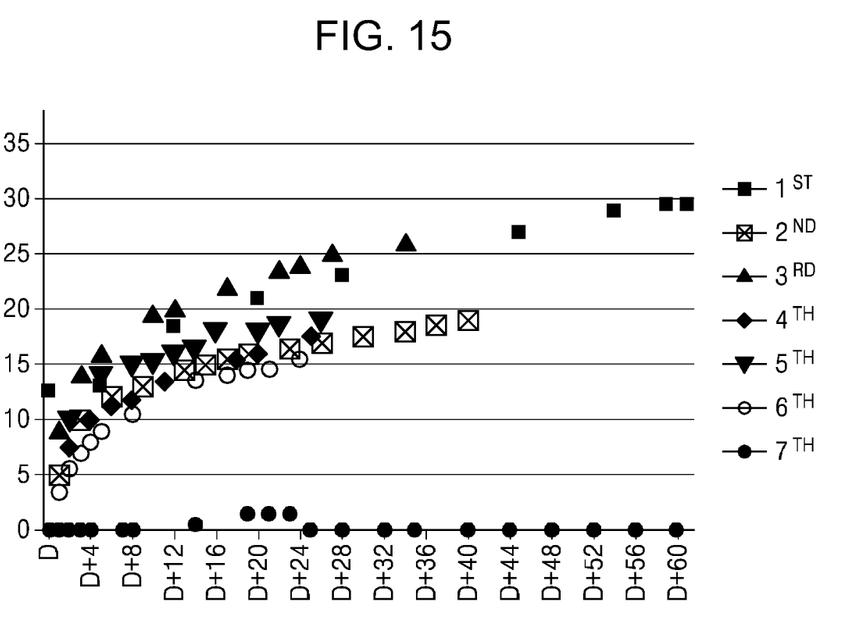
FIG. 15 shows the result of measuring the degrees of sagging for about two months.

FIG. 15 shows the result of measuring the degrees of sagging before and after applying a cover suspension structure according to an embodiment. The amount of sagging was measured by measuring the vertical displacement of an edge of the central hole from its original height.

Referring to FIG. 15, the first through sixth measurements show that the sagging was so severe that the cover had to be replaced in less than 60 days. Crystallite Backer was used for the cover material from the first to the fifth measurement and AN485 was used for the sixth measurement. Regardless of material, the sagging developed up to about 20 mm to 30 mm in less than 60 days.

The seventh measurement was conducted after a cover suspension structure according to FIG. 12 is installed. The result of the seventh measurement shows that there was almost no change in the sagging. There was no sagging until the 19th day since the installment. Since a sagging of 1.5 mm (abound 1/16") occurred on the 19th day, the sagging was set to 0 by adjusting a turnbuckle, i.e., a link member. There was no problematic sagging since the adjustment.

Meanwhile, when a hanging post is installed at a cover, local heat loss may occur due to the conduction and radiation of heat from the hanging post. To mitigate the heat loss, a portion at which the hanging post is positioned was supplemented with heat insulation materials, and therefore, local heat loss or local cooling was reduced.

Figure 16:
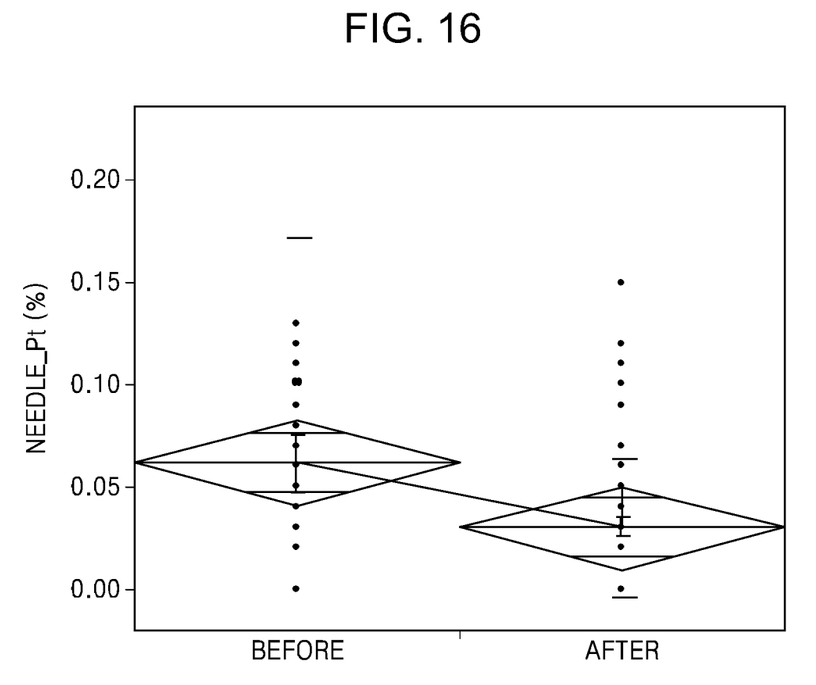
FIG. 16 shows the change in needle platinum content before and after the application of the stirring system according to one or more embodiments.

The existence of needle-shaped platinum contaminants (referred to herein as "needle Pt") in glass product was analyzed using a vision and image processing system before and after a stirring system according to one or more embodiments was applied. FIG. 16 illustrates a ratio of defective glass product due to needle Pt before and after a cover suspension structure according to FIG. 12 is installed. As shown in FIG. 16, it was confirmed that the ratio of defective glass product was greatly decreased after the installation.

As described above, the sagging of a cover causing contamination of stirred glass, damage to a rod, and so on was suppressed using a suspension structure according to one or more embodiments, representing an improvement over conditions where greater deformation or sagging of the cover occurred.

According to one or more embodiments, deformation or sagging of a cover closing the top of a stirring vessel can be suppressed. When the deformation or sagging of the cover is mitigated, occurrence of a crack in the cover and generation of particles from the crack are suppressed. By suppressing the generation of particles, contamination of molten material, e.g., molten glass, by such particles is likewise suppressed. As a result, productivity may be increased and the cost for maintenance of the cover may be decreased.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A molten material stirring system comprising:
a stirring vessel configured to accommodate molten material;
a stirring blade positioned inside the stirring vessel;
a rotating rod to which the stirring blade is fixed;
a cover disposed over the stirring vessel, the cover comprising a central hole configured to allow the rotating rod to extend therethrough;
a plurality of hanging posts positioned a predetermined distance between an outer edge of the cover and the central hole; and
a suspension system configured to impart a lifting force on the cover through the plurality of hanging posts.

2. The molten material stirring system of claim 1, wherein the cover comprises a first cover member and a second cover member divided by at least one border region extending through the central hole and each of the hanging posts comprises a first post member and a second post member respectively positioned on the first cover member and the second cover member proximate the border region and configured to face each other and to be combined with or separated from each other.

3. The molten material stirring system of claim 2, wherein the suspension system comprises a holder which holds the first post member and the second post member together.

4. The molten material stirring system of claim 3, wherein the hanging posts are symmetrically disposed with respect to the hole along the at least one border region.

5. The molten material stirring system of claim 3, wherein the suspension system comprises:
a rail-type fixed frame positioned at an upper portion of the stirring vessel;
a first moving frame configured relative to the fixed frame to be movable back and forth in a first direction;
a second moving frame configured to be movable back and forth a predetermined distance in a second direction different from the first direction; and
a link member suspending the holder from the second moving frame.

6. The molten material stirring system of claim 5, wherein the suspension system further comprises a locking device on the first moving frame to mechanically fix a position with respect to the fixed frame.

7. The molten material stirring system of claim 5, wherein the suspension system further comprises a locking device on the second moving frame to mechanically fix a position with respect to the first moving frame.

8. The molten material stirring system of claim 2, wherein the hanging posts are symmetrically disposed with respect to the hole along the at least one border region.

9. The molten material stirring system of claim 2, wherein each of the first and second post members comprises a bonding preventing coating layer.

10. The molten material stirring system of claim 9, wherein the bonding preventing coating layer comprises at least one of zirconia, silica, and alumina.

11. A molten material stirring method comprising:
accommodating molten material to be stirred in a stirring vessel covered with a cover comprising a central hole;
stirring the molten material in the stirring vessel using a stirring blade fixed to a rod passing through the central hole; and
imparting a lifting force from a suspension system upon the cover through a plurality of hanging posts, the plurality of hanging posts positioned a predetermined distance between an outer edge of the cover and the central hole.

12. The molten material stirring method of claim 11, wherein the hanging posts are symmetrically disposed with respect to the central hole.

13. The molten material stirring method of claim 12, further comprising forming a bonding preventing coating layer on each of the first and second post members.

14. The molten material stirring method of claim 11, wherein the cover is divided into a first cover member and a second cover member by at least one border region extending through the central hole, each of the hanging posts is divided into a first post member and a second post member respectively positioned on the first cover member and the second cover member proximate the border region to face each other and to be combined with or separated from each other, and the first post member and the second post member are held together by a holder of the suspension system.

* * * * *